United States Patent
Roberts et al.

(10) Patent No.: US 8,782,704 B2
(45) Date of Patent: Jul. 15, 2014

(54) PROGRAM GUIDE INTERFACE SYSTEMS AND METHODS

(75) Inventors: Brian F. Roberts, Dallas, TX (US); Donald H. Relyea, Dallas, TX (US); Heath Stallings, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 232 days.

(21) Appl. No.: 13/100,103

(22) Filed: May 3, 2011

(65) Prior Publication Data
US 2012/0284753 A1 Nov. 8, 2012

(51) Int. Cl.
| | |
|---|---|
| *G06F 3/00* | (2006.01) |
| *G06F 13/00* | (2006.01) |
| *H04N 5/445* | (2011.01) |
| *H04N 21/422* | (2011.01) |
| *H04N 21/426* | (2011.01) |
| *H04N 21/414* | (2011.01) |
| *H04N 21/482* | (2011.01) |
| *H04N 21/84* | (2011.01) |
| *H04H 60/72* | (2008.01) |
| *G06F 3/0488* | (2013.01) |

(52) U.S. Cl.
CPC ....... *H04N 21/42224* (2013.01); *H04N 21/426* (2013.01); *H04N 21/41407* (2013.01); *H04N 21/42204* (2013.01); *H04N 21/482* (2013.01); *H04N 21/4821* (2013.01); *H04N 21/4826* (2013.01); *H04N 21/42828* (2013.01); *H04N 21/84* (2013.01); *H04H 60/72* (2013.01); *G06F 3/0488* (2013.01)

USPC .................. 725/44; 725/37; 725/38; 725/39; 725/45; 725/46; 725/52; 725/56

(58) Field of Classification Search
CPC .................. H04N 21/4126; H04N 21/41407; H04N 21/42204; H04N 21/42224; H04N 21/482; H04N 21/4821; H04N 21/4826; H04N 21/4828; H04N 21/84; H04H 60/72; G06F 3/0488
USPC ...................................................... 725/37–61
See application file for complete search history.

(56) References Cited

U.S. PATENT DOCUMENTS

| | | | |
|---|---|---|---|
| 6,577,350 B1 * | 6/2003 | Proehl et al. ..................... 725/39 |
| 2002/0089519 A1 * | 7/2002 | Betz et al. ...................... 345/634 |
| 2002/0124252 A1 * | 9/2002 | Schaefer et al. ................. 725/33 |
| 2003/0088872 A1 * | 5/2003 | Maissel et al. .................. 725/46 |
| 2003/0184578 A1 * | 10/2003 | Cowperthwaite ............. 345/721 |
| 2006/0218588 A1 * | 9/2006 | Kelts ............................... 725/39 |
| 2007/0157248 A1 * | 7/2007 | Ellis ................................ 725/47 |
| 2010/0077431 A1 * | 3/2010 | Neufeld et al. ................. 725/39 |
| 2010/0287033 A1 * | 11/2010 | Mathur ........................... 725/44 |

* cited by examiner

*Primary Examiner* — Jeremy Duffield

(57) ABSTRACT

Exemplary program guide interface systems and methods are disclosed herein. An exemplary method includes a mobile device presenting a program guide interface by way of a touch screen, detecting a pinch gesture provided in relation to the program guide interface, and presenting, in response to the pinch gesture, a plurality of graphical objects representative of a plurality of media programming channel groups. Corresponding methods, systems, and devices are also disclosed.

25 Claims, 16 Drawing Sheets

Fig. 4

| Channel | Program | |
|---|---|---|
| 840 Encore HD | Pearl Harbor | Daddy Day Care |
| 842 Starz Edge HD | Pineapple Express | Brooklyn's Finest |
| 845 Starz Kids | Wall-e | Astro Boy |
| 847 Starz Comedy | Step Brothers | Year One |
| 850 Starz HD | Hancock | The Proposal |
| 865 Showtime HD | The Tudors | Kill Bill: Vol. 1 |
| 866 Showtime West | Championship Boxing | The Boys Are Back |
| 869 Sho 2 | Good Luck Chuck | Miss Conception |
| 870 Sho 2 West | Nurse Jackie | Enemies Among Us |

*Program Guide*

Fig. 5

Program Guide

| Channel | | | | |
|---|---|---|---|---|
| 840 Encore HD | Pearl Harbor | | Daddy Day Care | |
| 842 Starz Edge HD | Pineapple Express | | Brooklyn's Finest | |
| 845 Starz Kids | Wall-e | Astro Boy | | |
| 847 Starz Comedy | Step Brothers | Year One | | |
| 850 Starz HD | Hancock | | The Proposal | |
| 865 Showtime HD | The Tudors | Kill Bill: Vol. 1 | | |
| 866 Showtime West | Championship Boxing | | The Boys Are Back | |
| 869 Sho 2 | Good Luck Chuck | | Miss Conception | |
| 870 Sho 2 West | Nurse Jackie | | Enemies Among Us | |

402, 404, 400, 500

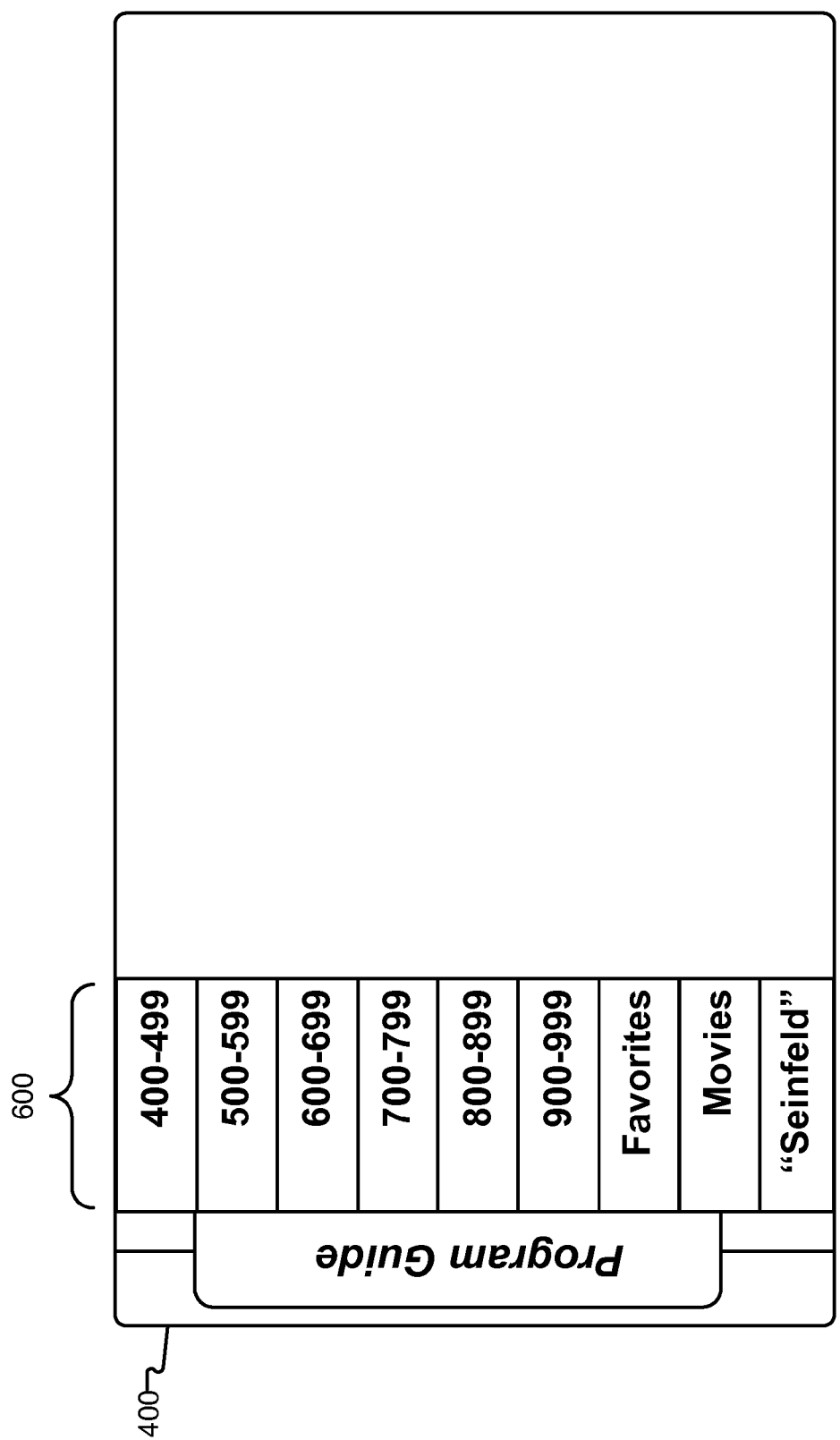

Fig. 12

Program Guide

| Channel | | | |
|---|---|---|---|
| 845 Starz Kids | Wall-e 12:30-2:00 Rated: G | Astro Boy 2:00-3:30 Rated: PG | |
| 847 Starz Comedy | Step Brothers 12:00-2:00 Rated: R | Year One 2:00-4:00 Rated: PG-13 | |
| 850 Starz HD | Hancock 12:45-2:30 Rated: PG-13 | | The Proposal 2:30-4:30 Rated: PG-13 |
| 865 Showtime HD | The Tudors 1:00-2:00 Rated: NR | Kill Bill: Vol. 1 2:00-4:00 Rated: NC-17 | |
| 866 Showtime West | Championship Boxing 1:00-2:15 Rated: NR | | The Boys Are Back 2:15-4:00 Rated: TV-14 |

400, 402, 404

Program Guide — 402

| 847 Starz Comedy | Step Brothers — Two aimless middle-aged losers still living at home are forced against their will ... 12:00-2:00 Rated: R | Year One — After being banished from their tribe, two hunter-gatherers encounter Biblical characters and eventually wind up in the city of Sodom. 2:00-4:00 Rated: PG-13 |
| --- | --- | --- |
| 850 Starz HD | Hancock — A hard-living superhero who has fallen out of favor with the public enters into a questionable relationship with the wife of the public relations professional who's trying to repair his image. 12:45-2:30 Rated: PG-13 | The Proposal — A pushy boss forces her young assistant to marry her in order to keep her Visa status in the U.S. and avoid deportation to Canada. 2:30-4:30 Rated: PG-13 |
| 865 Showtime HD | The Tudors — A dramatic series about the reign and marriages of King Henry VIII. 1:00-2:00 Rated: NR | Kill Bill: Vol. 1 — The Bride wakes up after a long coma. The baby that she carried before entering the coma is gone. The only thing on her mind is to have revenge on the assassination team ... 2:00-4:00 Rated: NC-17 |

PROGRAM GUIDE INTERFACE SYSTEMS AND METHODS

BACKGROUND INFORMATION

Program guides are a useful tool for providing program guide information (e.g., information associated with a media program schedule, one or more media programs, one or more media programming channels, etc.) to users of media content access devices. For example, a user may utilize a program guide to learn when the user's favorite media programs (e.g., television programs, movies, etc.) are scheduled and which media programming channels (e.g., television channels) will provide the programs. In recent years, some program guides have been made available in electronic format by way of graphical user interfaces (or "program guide interfaces") that facilitate navigation of and/or interaction with the program guides.

However, a number of disadvantages exist with respect to traditional program guide interfaces. For example, some traditional program guide interfaces provide a limited number of options for navigating between channels listed in the program guide. This problem is magnified by the hundreds, if not thousands, of available channels and by the rigid numerical organization of the channels within the program guide. As a result, a user wanting to view program guide information associated with a particular channel of interest may be required to scroll through hundreds of other channels or manually input the desired channel number. This process can be both time-consuming and frustrating for the user. Furthermore, because of a lack of customizable navigation features, traditional program guide interfaces may seem unintuitive and/or impersonal for users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 4-14 illustrate exemplary views of a program guide interface according to principles described herein.

DETAILED DESCRIPTION OF PREFERRED EMBODIMENTS

Exemplary program guide interfaces configured to facilitate navigation of program guide information are disclosed herein. In accordance with principles described herein, an exemplary program guide interface may facilitate navigation of a program guide in a convenient, intuitive, and/or personalized manner. In certain examples, a program guide interface may provide one or more jump points by way of which a user can quickly and conveniently access program guide information associated with one or more corresponding groups of media programming channels (e.g., television channels, such as cable television channels, satellite television channels, over-the-air television channels, etc.). In some examples, the jump points may be provided in response to a pinch gesture provided by the user by way of a touch screen, and the program guide information associated with a particular channel group may be provided in response to a reverse pinch gesture provided in relation to a corresponding jump point. Accordingly, a user may utilize the program guide interface to selectively access and focus on channels, media programs, and corresponding program guide information of interest to the user. Exemplary systems, methods, and devices associated with program guide interfaces will now be described in reference to the drawings.

Figure 1:
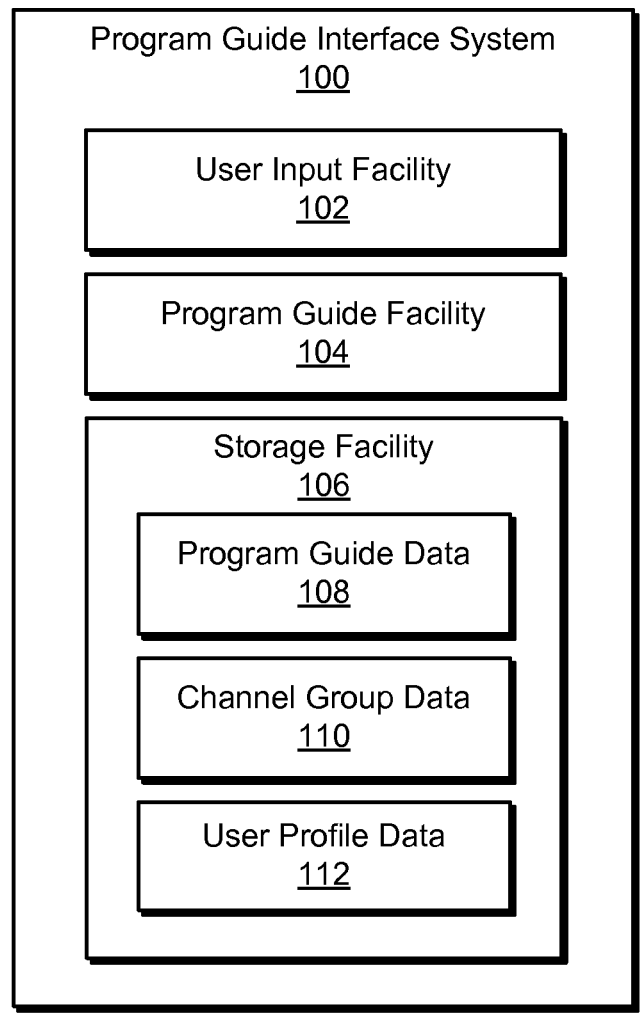
FIG. 1 illustrates an exemplary program guide interface system according to principles described herein.

FIG. 1 illustrates an exemplary program guide interface system 100 (or simply "system 100"). As shown, system 100 may include, without limitation, a user input facility 102 (or simply "input facility 102"), a program guide facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Any suitable communication technologies, including any of the communication technologies mentioned herein, may be employed to facilitate communications between facilities 102-106.

As will be explained in more detail below, input facility 102 may be configured to detect, receive, and/or facilitate user input in any suitable manner. In some examples, input facility 102 may be configured to detect one or more user interactions with a program guide interface. For example, input facility 102 may be configured to detect one or more touch gestures (e.g., pinch gestures, reverse pinch gestures, swipe gestures, tap gestures, etc.) provided by a user by way of a touch screen. In some examples, the detected touch gestures may be provided in relation to and/or directed at one or more elements of a program guide interface displayed on the touch screen.

Input facility 102 may be additionally or alternatively configured to receive data representative of user input. For example, input facility 102 may receive one or more user configurable parameters from a user, one or more user commands from the user, and/or any other suitable user input.

User input and data received by input facility 102 may be utilized by system 100 to manage, control, and/or facilitate navigation of a program guide interface. For example, in response to one or more touch gestures detected by input facility 102, system 100 may provide one or more jump points configured to allow a user to access program guide information associated with one or more corresponding channel groups. Additionally or alternatively, one or more user inputs received by input facility 102 may be utilized by system 100 to establish one or more customized channel groups for the user, as will be described in more detail below.

Program guide facility 104 may be configured to provide, manage, and/or control a program guide interface and corresponding program guide information. The program guide interface may be configured to facilitate access by a user to an electronic program guide including program guide information associated with a plurality of media programming channels. In some examples, program guide facility 104 may present a program guide interface by way of a touch screen to facilitate user interaction with the program guide interface.

As used herein, "program guide information" may refer to any information available by way of a program guide. Exemplary program guide information may include information associated with one or more media programming channels (e.g., channel numbers, channel call signs, channel descriptions, etc.), information associated with a media programming schedule (e.g., identifying scheduled media programs and/or corresponding start and stop times), information associated with one or more media programs (e.g., titles, descriptions, cast members, durations, maturity ratings, user ratings, genres, moods, release dates, etc.), and/or any other suitable information associated with a program guide and/or corresponding media content.

As used herein, "media content," "media content programming," and "media programming" may refer generally to any media content accessible via a media content access device. The term "media content instance" and "media program" will be used herein to refer to any television program, on-demand media program, pay-per-view media program, broadcast media program (e.g., broadcast television program), multicast media program (e.g., multicast television program), narrowcast media program (e.g., narrowcast video-on-demand program), IPTV media content, advertisement (e.g., commercial), video, movie, or any segment, component, or combination of these or other forms of media content that may be processed by a media content access device for experiencing by a user.

Program guide facility 104 may be configured to allow a user to selectively access program guide information associated with unique media programming channel groups (or simply "channel groups"). For example, program guide facility 104 may allow a user to selectively focus a program guide interface on program guide information associated with a specific group of channels.

As used herein, "media programming channel group" and "channel group" may refer to any suitable group of media programming channels. In some examples, a media programming channel group may be associated with and/or include channels associated with one or more common characteristics. For example, a channel group may include channels that are associated with and/or that deliver media programs associated with a particular series of channel numbers (e.g., 100s, 200s, 300s, etc.), a particular topic or category (e.g., sports, news, entertainment, children, etc.), a particular genre (e.g., action, comedy, drama, etc.), a particular person (e.g., an actor, director, producer, etc.), a particular type of media programming (e.g., movies, television, etc.), a particular media program, (e.g., a program titled "The Simpsons"), one or more particular keywords (e.g., a noun, a phrase, a quote, etc.), and/or any other suitable characteristic or combination of characteristics associated with a channel or corresponding media programming.

In some examples, a media programming channel group may dynamically change over time. For example, a media programming channel group may be configured to include only channels that are currently delivering and/or scheduled to soon deliver (e.g., within a predetermined time period, such as within the same day, a predetermined number of hours, a predetermined number of days, etc.) media programs associated with one or more particular characteristics and/or satisfying one or more particular criteria. To illustrate, an exemplary media program channel group may be configured to include only channels that are currently delivering episodes of a particular television program (e.g., "Dora the Explorer"). As a result, the channels included in the channel group may dynamically change depending on which channels are currently delivering and/or scheduled to soon deliver the desired television program. This way, a user can utilize a dynamic channel group to conveniently and quickly isolate program guide information associated with channels that are currently delivering and/or scheduled to soon deliver the desired media content.

Program guide facility 104 may be configured to automatically generate a media programming channel group in any suitable manner. For example, program guide facility 104 may utilize user profile information (e.g., information representing a user's interactions, tendencies, preferences, traits, media content viewing history, etc.) associated with a user and/or parse data from media content accessed by the user to automatically generate a customized channel group for the user. To illustrate, program guide facility 104 may automatically generate a channel group including the user's favorite channels (e.g., the channels the user most often accesses). Additionally or alternatively, program guide facility 104 may automatically generate a mood-based channel group by detecting a user's mood (e.g., based on an analysis of media content recently accessed by the user) and then generating a channel group including channels associated with the detected mood, currently delivering media programs associated with the detected mood, and/or scheduled to deliver media programs associated with the detected mood.

In some examples, a media programming channel group may be associated with social media activity and/or viewership statistics. For example, program guide facility 104 may be configured to generate a channel group based on social media communications (e.g., Facebook wall postings, Twitter "tweets", etc.) and/or viewership statistics associated with media programs and/or corresponding media programming channels. To illustrate, each channel and/or media program may be associated with a particular popularity ranking based on social media activity and/or viewership statistics, and program guide facility 104 may generate a channel group including the most popular channels and/or programs based on the popularity rankings. In some examples, the channels may be listed within a channel group in accordance with their corresponding popularity rankings. Additionally or alternatively, the channel group may be dynamically updated (e.g., in real time or at a predetermined frequency) to reflect changes in popularity rankings. Accordingly, a user can utilize the channel group to access the channels/programs that are most popular and/or talked about.

In certain embodiments, a media programming channel group may be created and/or customized by a user. For example, a user may provide user input representing one or more user configurable parameters (e.g., criteria) to be associated with a custom channel group, and program guide facility 104 may generate and/or manage the custom channel group in accordance with the received user input. To illustrate, a user may designate one or more specific channels to be included in a channel group, one or more specific characteristics to be associated with the channel group, and/or any other suitable user criteria to be satisfied before a channel can be included in the channel group. Thereafter, program guide facility 104 may generate and/or manage the channel group in accordance with the user's criteria. As an example, a user may designate particular topic (e.g., travel) to be associated with a custom channel group, and program guide facility 104 may include any channels associated with the particular topic in the custom channel group. Thereafter, the user can utilize the custom channel group to conveniently access channels, media programs, and/or corresponding program guide information associated with the specified topic.

Program guide facility 104 may be configured to facilitate a user's access to program guide information associated with one or more channel groups in any suitable manner. For example, program guide facility 104 may present (e.g., by way of a display screen, such as a touch screen) one or more graphical objects representative of one or more channel groups and configured to act as jump points to program guide information associated with the channel groups.

As used herein, the term "graphical object" may refer to any suitable graphics and/or corresponding text that are representative of a channel group. In certain examples, a graphical object may include a colored block representing a channel group and including text identifying the represented channel group. In additional or alternative examples, a graphical object may include any other suitable graphical object and/or represent a channel group in any other suitable manner.

Program guide facility 104 may present one or more graphical objects in any suitable manner. In certain examples, program guide facility 104 may present one or more graphical objects in response to a touch gesture provided by a user. To illustrate, in response to a pinch gesture detected by input facility 102 and/or provided in relation to a program guide interface, program guide facility 104 may present one or more graphical objects to the user. In some examples, program guide facility 104 may present the graphical objects within the program guide interface itself (e.g., in place of a listing of channels and/or corresponding program guide information), overlaid onto at least a portion of the program guide interface (e.g., within a separate window), and/or in any other suitable manner.

As mentioned above, a graphical object representative of a channel group may be configured to act as a jump point within a program guide interface to program guide information associated with the channel group. For example, a user may utilize the graphical object to access program guide information associated with the channel group and/or limit the program guide information included in the program guide interface to program guide information associated with the channel group. To illustrate, a user may provide a touch gesture (e.g., a reverse pinch gesture) in relation to a particular presented graphical object that is representative of a particular channel group, which touch gesture may be detected by input facility 102. In response to the detected touch gesture, program guide facility 104 may present program guide information related to the channel group within the program guide interface and exclude any unrelated program guide information from the program guide interface, as will be explained in more detail below.

In some examples, program guide facility 104 may be additionally or alternatively configured to allow a user to selectively expand and/or contract the level of detail of program guide information included within a program guide interface. For example, in response to one or more touch gestures provided by the user, program guide interface 104 may be configured to present expanded and/or contracted levels of detail of program guide information. To illustrate, a user may provide one or more reverse pinch gestures in relation to a program guide interface to expand the level of detail of program guide information presented within the program guide interface. Additionally or alternatively, the user may provide one or more pinch gestures in relation to the program guide interface to contract the level of detail of program guide information presented within the program guide interface. In some examples, the level of detail of program guide information presented within a program guide interface may be expanded and/or contracted without zooming in to and/or out from the program guide interface. For example, as a user expands and contracts the level of detail, the size of font presented within the program guide interface, the width of rows presented within the program guide interface, and/or the size of any other element of the program guide interface may remain constant. In some examples, only the height of rows presented within the program guide interface may be adjusted to accommodate the expanded and/or contracted levels of detail, as will be explained in more detail below.

Storage facility 106 may maintain program guide data 108 representative of program guide information. In some examples, at least a portion of program guide data 108 may be received from a program guide information provider and/or one or more other suitable sources. Additionally or alternatively, program guide facility 104 may communicate with storage facility 106 to access and use program guide data 108 to present program guide information represented by program guide data 108 within a program guide interface. Storage facility 106 may additionally or alternatively maintain channel group data 110 representative of one or more media programming channel groups and user profile data 112 representative of user profile information associated with a user of system 100. In some examples, storage facility 106 may be configured to dynamically update data 108-112 in accordance with user interactions, user input, and/or media program schedules. Storage facility 106 may be configured to maintain additional or alternative data as may serve a particular implementation.

Figure 2:
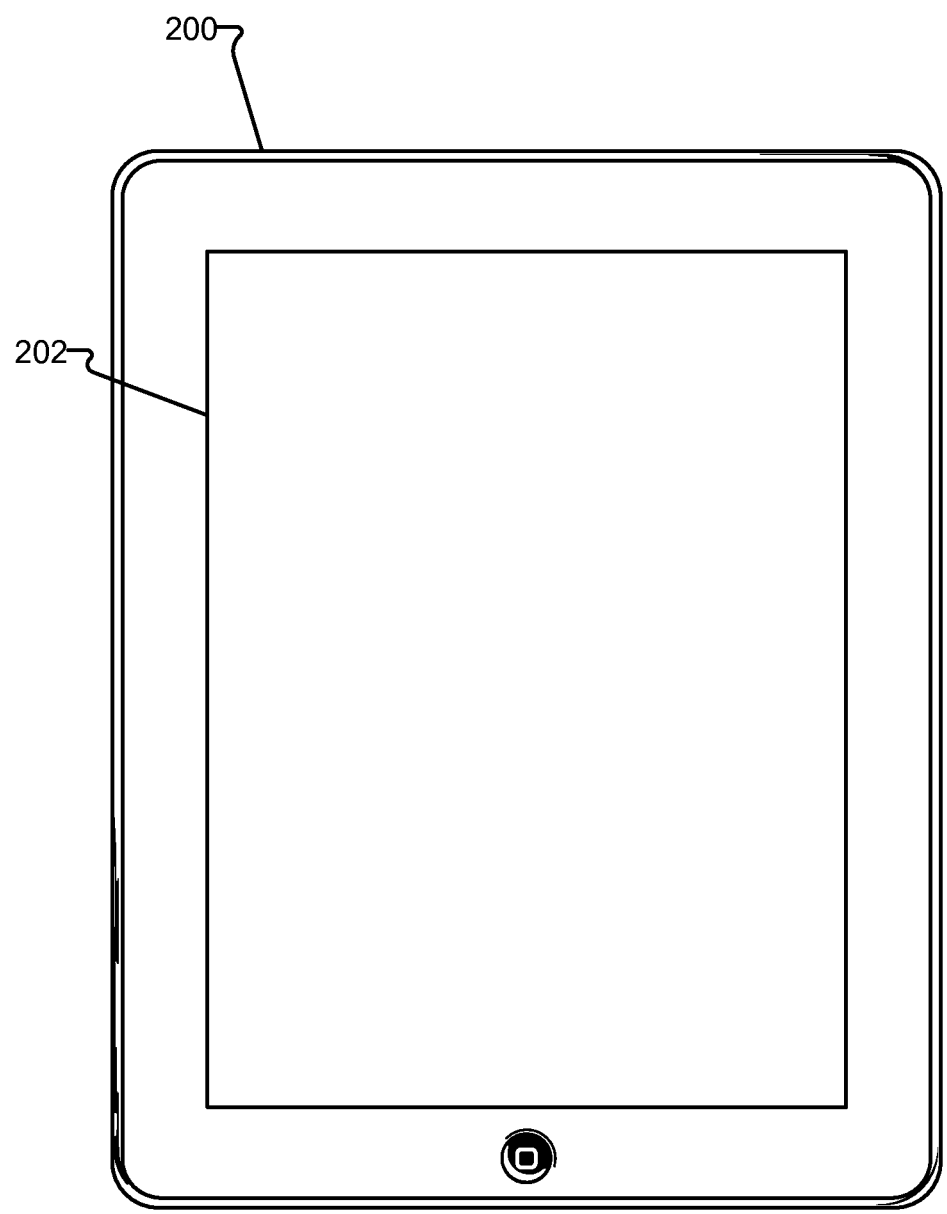
FIG. 2 illustrates an exemplary mobile device implementing the system of FIG. 1 according to principles described herein.

In some examples, system 100 may be implemented partially or entirely by a mobile device. For example, FIG. 2 illustrates an exemplary mobile device 200 that may implement one or more of facilities 102-106. Mobile device 200 may be configured to present and/or process program guide information and/or media content. For example, mobile device 200 may perform one or more operations associated with the presentation, processing, and/or management of a program guide interface, such as disclosed herein.

In FIG. 2, mobile device 200 is a tablet computer. However, in additional or alternative examples, system 100 may be implemented by any other suitable mobile device, such as, but not limited to, a mobile phone device, a handheld device, a laptop computer, a personal-digital assistant device, and/or any other suitable mobile device configured to perform one or more of the processes and/or operations described herein.

Mobile device 200 may include and/or be associated with a touch screen 202 by way of which a program guide interface may be presented and/or by way of which user input may be received and/or detected. Additionally or alternatively, mobile device 200 may include any other suitable input device (e.g., a keypad, one or more input buttons, etc.).

In some examples, a user may utilize touch screen 202 to provide one or more touch gestures, interact with a program guide interface, and/or access program guide information. To illustrate, a user may utilize touch screen 202 to access jump points associated with one or more media programming channel groups and/or utilize the jump points to access program guide information associated with the channel groups. Additionally or alternatively, a user may utilize mobile device 200 and/or touch screen 202 to create one or more customized media programming channel groups, manage one or more channel groups, access media content, and/or perform any other suitable operations associated with mobile device 200.

In some examples, mobile device 200 may be configured to operate as a companion device to one or more media content access devices (e.g., a set-top box device, a DVR device, a gaming device, etc.). For example, mobile device 200 may be configured to allow a user to utilize mobile device 200 to control one or more operations of a corresponding media content access device. To illustrate, a user watching a television program by way of a set-top box device may utilize mobile device 200 to change channels on the set-top box device, schedule one or more recordings on the set-top box device, and/or perform any other suitable operation associated with the set-top box device.

Mobile device 200 may communicate with a media content access device, a program guide information provider, and/or a media content provider in any suitable manner. For example, mobile device 200 may utilize any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies. Additionally or alternatively, mobile device 200 may utilize one or more networks, including, but not limited to, wireless networks (Wi-Fi networks), wireless data communication networks (e.g., 3G and 4G networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, local area networks, and any other networks or combination of networks capable of carrying data and/or communications signals.

Figure 3:
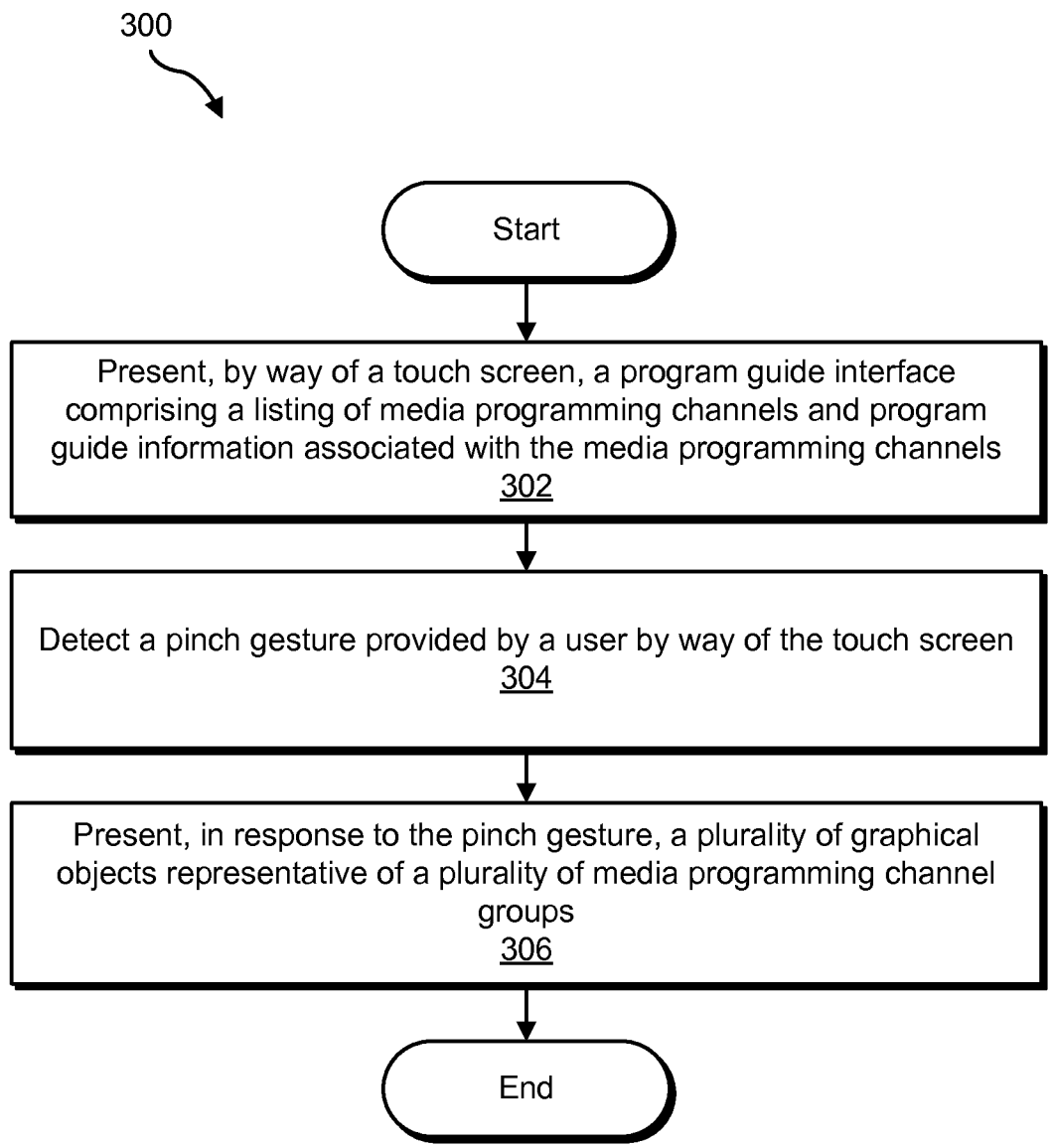
FIG. 3 illustrates an exemplary method of managing a program guide interface according to principles described herein.

FIG. 3 illustrates an exemplary method 300 of managing a program guide interface. While FIG. 3 illustrates exemplary steps according to one embodiment, other embodiments may omit, add to, reorder, and/or modify any of the steps shown in FIG. 3. One or more steps of method 300 may be performed by system 100 and/or mobile device 200.

In step 302, a mobile device presents, by way of a touch screen, a program guide interface comprising a listing of media programming channels and program guide information associated with the media programming channels. The mobile device may present the program guide interface in any suitable manner, such as disclosed herein. For example, mobile device 200 may be configured present the program guide interface by way of touch screen 202.

To illustrate, FIG. 4 shows an exemplary program guide interface 400 that may be presented by mobile device 200 by way of touch screen 202. As shown, program guide interface 400 may include a listing 402 of media programming channels and program guide information 404 corresponding to the channels included in listing 402. In some examples, listing 402 may be organized into a vertical column and program guide information 404 may be organized into a plurality of rows, with each row corresponding to a channel listed within listing 402.

In some examples, a user may selectively navigate within program guide interface 400 (e.g., scroll up, down, left, and/or right) to change the channels listed within listing 402 and/or the program guide information included within program guide information 404. To illustrate, a user may scroll up or down within program guide interface 400 (e.g., using one or more vertical swipe gestures) to access channels coming before or after the channels included in listing 402 and/or scroll left or right (e.g., using one or more horizontal swipe gestures) to access program guide information associated with media programs scheduled earlier or later than those identified in program guide information 404.

Listing 402 may include any suitable information associated with the listed channels. For example, listing 402 may include channel numbers, channel call signs, channel names, and/or channel logos. Program guide information 404 may include any suitable program guide information associated with the scheduled media programs. For example, program guide information 404 may include titles, descriptions, ratings, start and/or stop times, casts, and/or genres associated with the scheduled media programs.

Program guide interface 400 and the components thereof are provided for illustrative purposes only. One will appreciate that the principles described herein may be implemented in accordance with any other suitable program guide interface. For example, the structure, organization, layout, look, feel, and/or format of program guide interface 400 may be modified in any suitable manner, as may serve a particular implementation.

Returning to FIG. 3, in step 304, the mobile device detects a pinch gesture provided by a user by way of the touch screen. The mobile device may detect the pinch gesture in any suitable manner, such as disclosed herein. For example, mobile device 200 may detect a pinch gesture provided by way of touch screen 202. In some examples, the pinch gesture may be provided in relation to the presented program guide interface.

To illustrate, FIG. 5 illustrates a user 500 providing a pinch gesture in relation to program guide interface 400. As shown, the pinch gesture may be provided in relation to listing 402 (e.g., within the vertical column including listing 402). In additional or alternative examples, the pinch gesture may be provided in relation to the rows of program guide information 404.

Returning to FIG. 3, in step 306, the mobile device presents, in response to the pinch gesture, a plurality of graphical objects representative of a plurality of media programming channel groups. For example, mobile device 200 may present any suitable graphical objects representative of any suitable channel groups, such as disclosed herein.

In some examples, mobile device 200 may be configured to present the graphical objects within the program guide interface. To illustrate, FIG. 6 shows a view of program guide interface 400 wherein program guide interface 400 includes a plurality of graphical objects 600 representative of a plurality of corresponding channel groups. Graphical objects 600 may be representative of any suitable channel groups, such as disclosed herein. Mobile device 200 may be configured to present graphical objects 600 in response to the pinch gesture provided by user 500 (see FIG. 5) and/or in response to any other suitable command provided by user 500.

Figure 7:
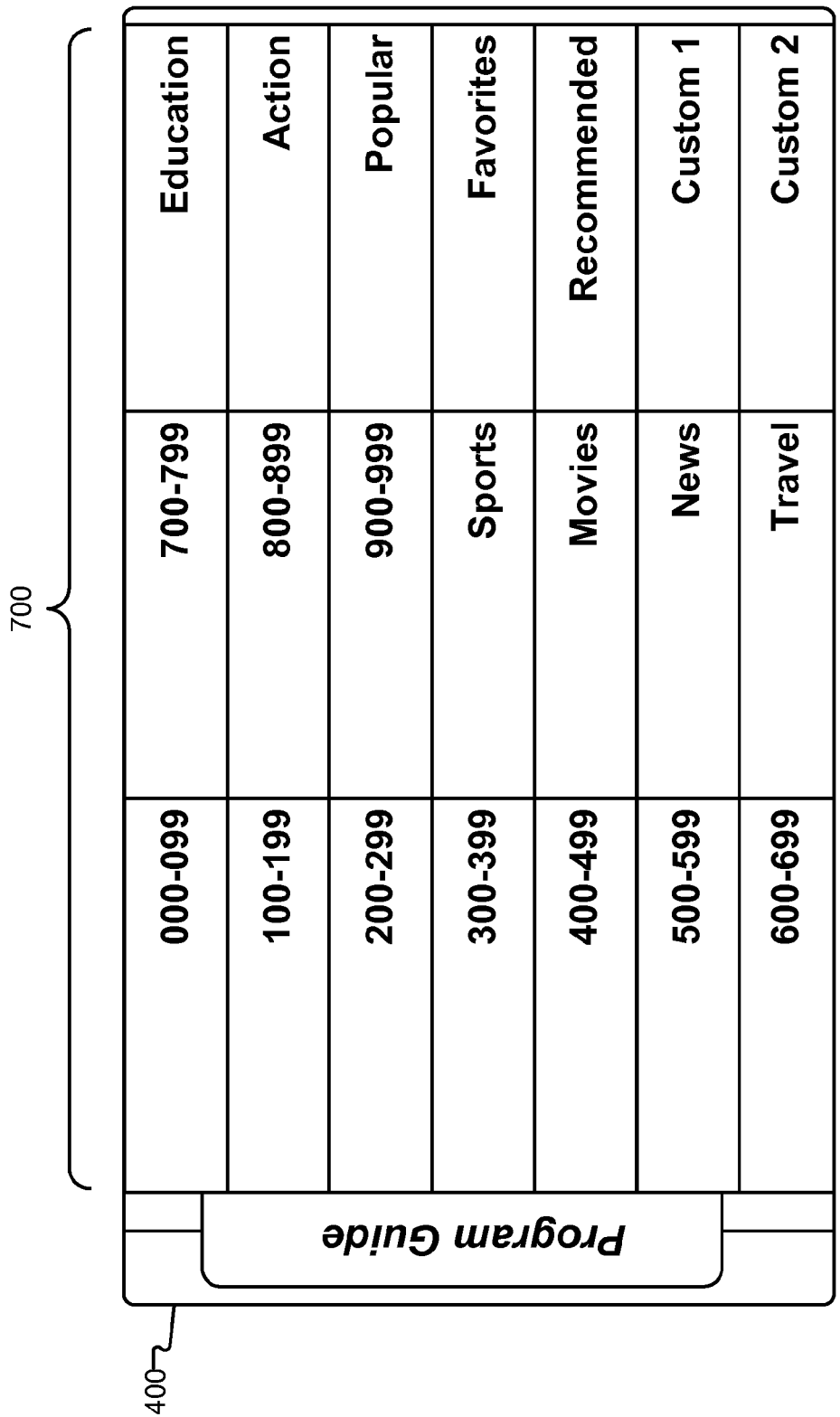

As shown, graphical objects 600 are presented within program guide interface 400 in place of listing 402 (see FIGS. 4-5). In other examples, graphical objects may be presented within program guide interface 400 in any other suitable manner. For example, FIG. 7 shows another exemplary view of program guide interface 400 wherein listing 402 and program guide information 404 (see FIGS. 4-5) have been replaced by graphical objects 700.

Figure 8:
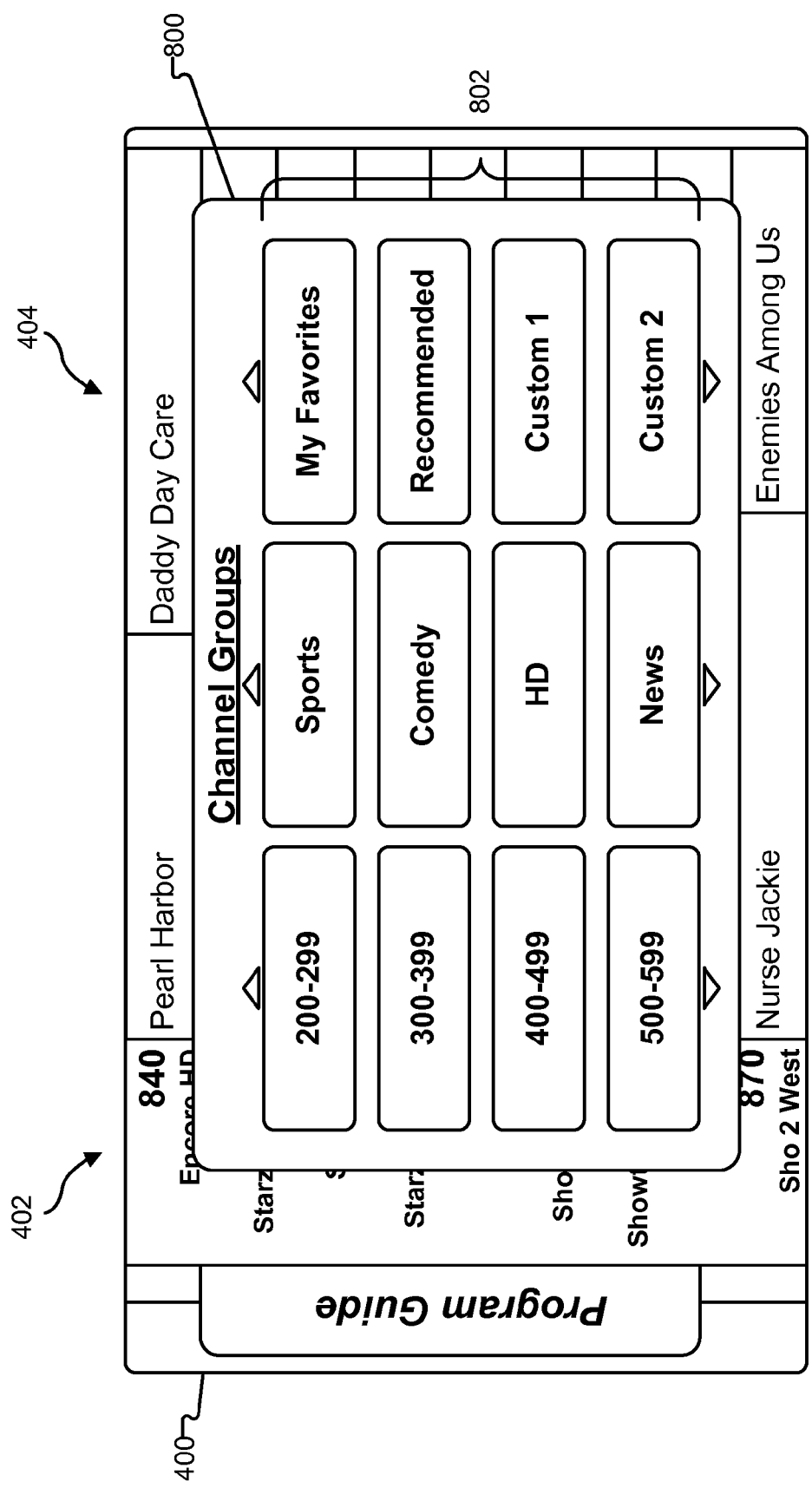

In additional or alternative examples, mobile device 200 may be configured to present graphical objects of channel groups in any other suitable manner. For example, mobile device 200 may be configured to present graphical objects overlaid onto at least a portion of program guide interface 400 and/or within a separate window. To illustrate, FIG. 8 shows another exemplary view of program guide interface 400 in which a pop-up window 800 is overlaid onto program guide interface 400 and includes a plurality of graphical objects 802 representative of corresponding channel groups.

Graphical objects 600, 700, and 802 may be configured to act as jump points to corresponding channel groups and/or program guide information. For example, a user may selectively interact with graphical objects 600, 700, and 802 to access corresponding listings of channels and/or program guide information within program guide interface 400.

To illustrate, and returning to FIG. 6, upon being presented with graphical objects 600, a user may wish to access program guide information associated with the graphical object 600 titled "Seinfeld." In some examples, the "Seinfeld" channel group may be a user-customized channel group configured to include any channels that are currently delivering or scheduled to deliver episodes of a television program titled "Seinfeld" or other media programs associated with an actor named "Seinfeld." In some examples, the user may access program guide information associated with the "Seinfeld" channel group by providing one or more touch gestures in relation to the corresponding graphical object 600.

Figure 9:
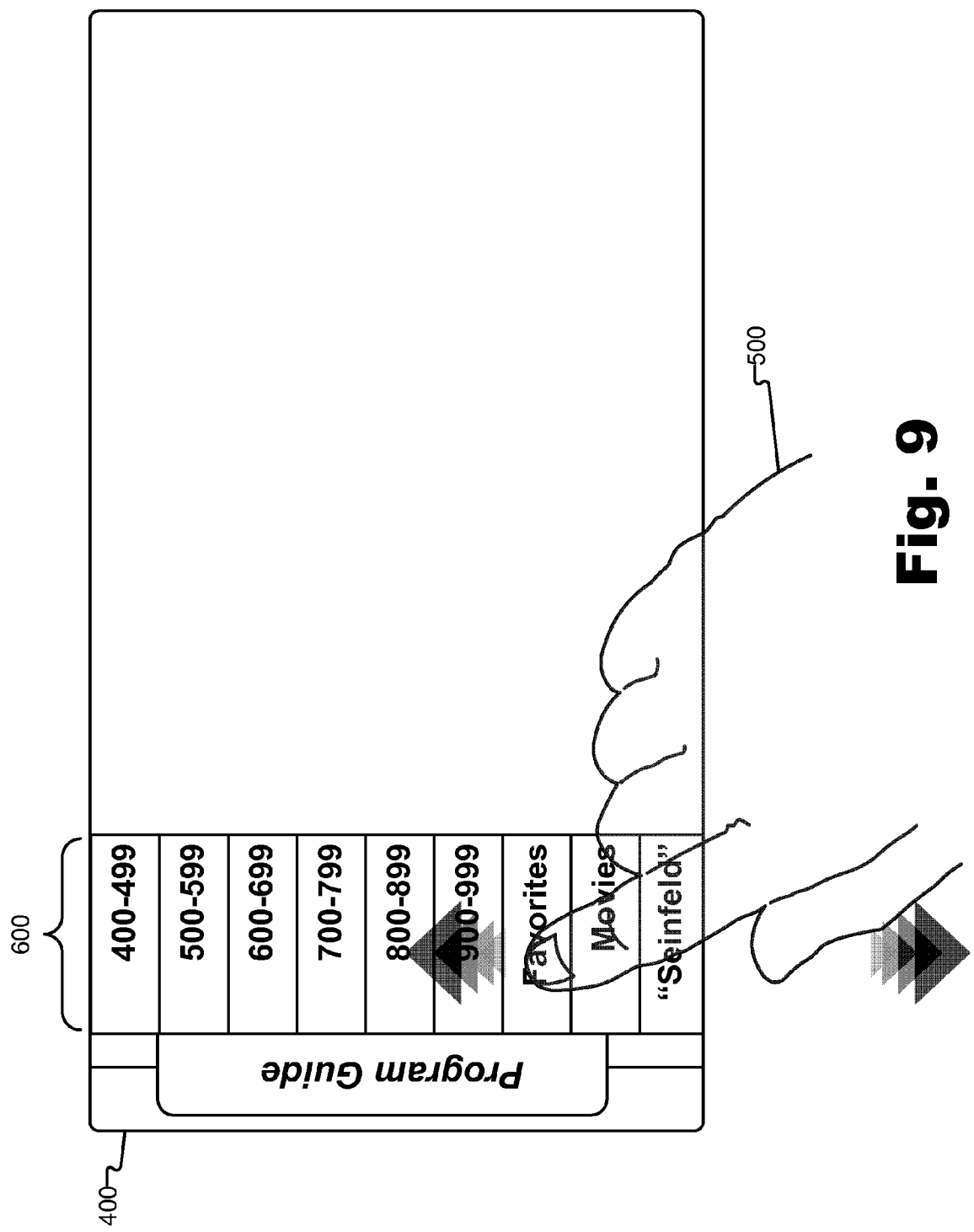
Figure 10:
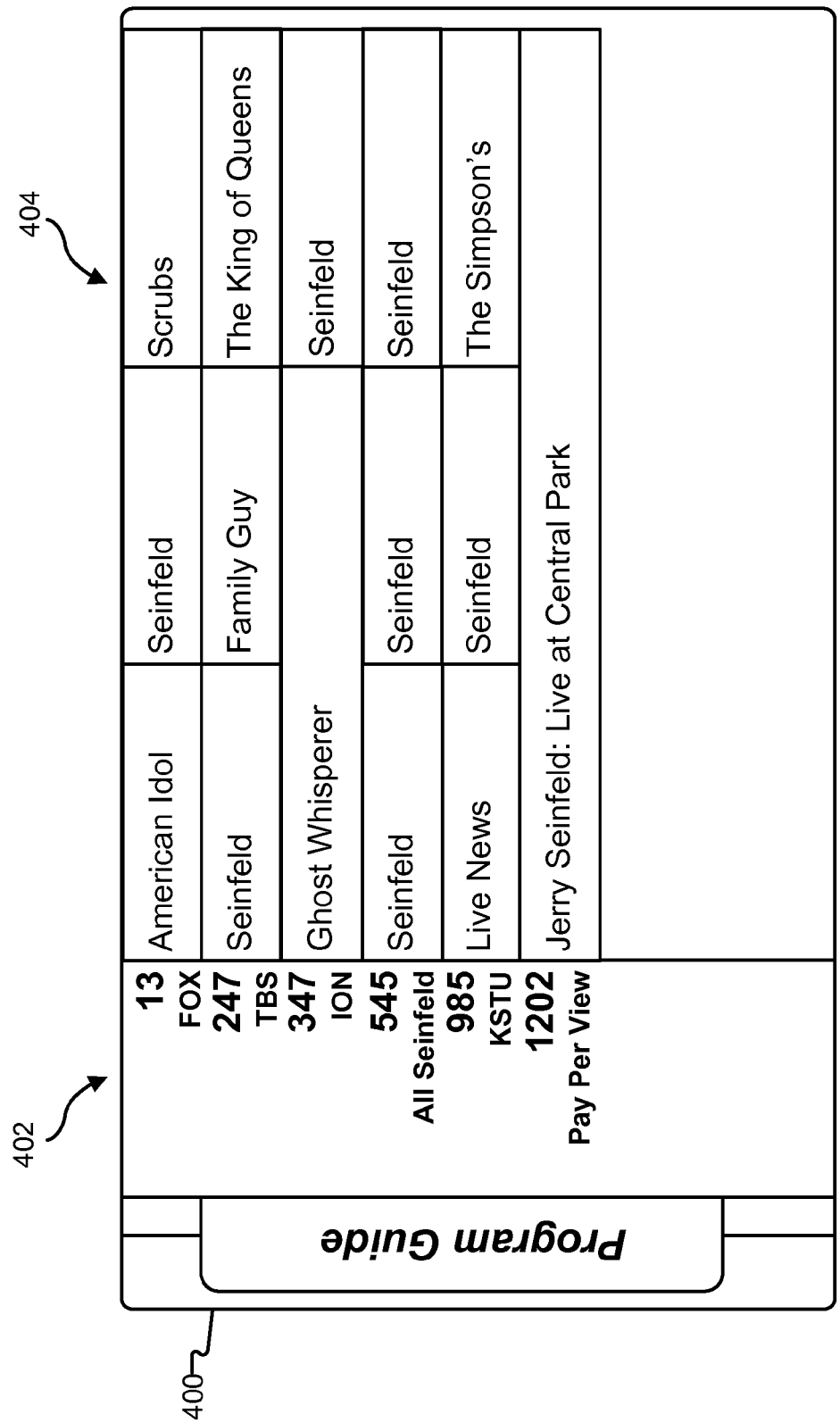

For example, FIG. 9 shows another view of program guide interface 400. As shown in FIG. 9, user 500 may provide a reverse pinch gesture in relation to the graphical object 600 representative of the "Seinfeld" channel group (e.g., a reverse pinch gesture that begins within the screen area on which the "Seinfeld" graphical object 600 is displayed). In response to the reverse pinch gesture, mobile device 200 may be configured to present program guide information associated with the "Seinfeld" channel group within program guide interface 400. For example, FIG. 10 shows a view of program guide interface 400 that may be provided in response to the detected reverse pinch gesture shown in FIG. 9. As shown, listing 402 may include only channels satisfying the criteria associated with the "Seinfeld" channel group (e.g., channels currently delivering or scheduled to deliver "Seinfeld" media content), and program guide information 404 may include program guide information associated with the channels included in listing 402, including information associated with the scheduled media programs.

In accordance with the foregoing, a user can use program guide interface 400 to quickly and conveniently access channels and program guide information of interest to the user and/or in accordance with unique channel groups, whether generated by system 100 and/or customized by a user. In additional or alternative examples, the user may utilize program guide interface 400 to direct mobile device 200 and/or a separate media content access device (e.g., a separate set-top box device) to tune to a desired channel or media program identified within program guide interface 400.

Figure 11:
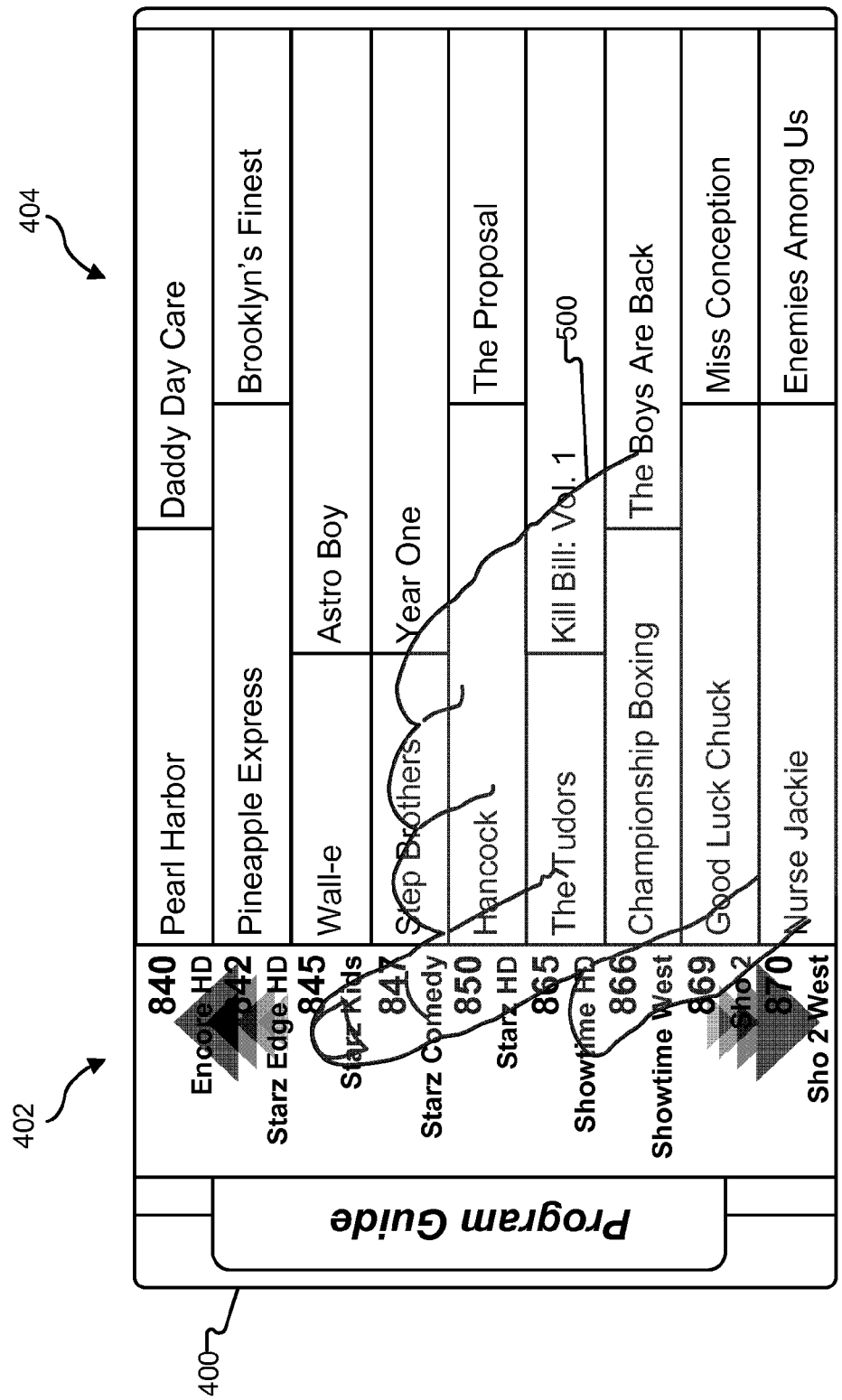

As mentioned above, program guide interface 400 may be additionally or alternatively configured to allow a user to selectively expand or contract levels of detail of program guide information 404. For example, and returning to FIG. 4, a user may utilize program guide interface 400 to selectively expand the level of detail included in program guide information 404 (e.g., to access more program guide information associated with the scheduled media programs). To do so, and as shown in FIG. 11, user 500 may provide a reverse pinch gesture in relation to program guide interface 400. In response to the reverse pinch gesture, mobile device 200 may present an expanded level of detail within program guide information 404. For example, FIG. 12 shows an exemplary view of program guide interface 400 in which program guide information 404 includes an additional level of detail associated with the scheduled media programs. In particular, program guide information 404 now includes start and stop times as well as maturity ratings for each of the scheduled media programs. As shown, in some examples, listing 402 may include fewer channels and/or the height of the rows of program guide information 404 may be increased to accommodate the additional level of detail. However, as opposed to a true "zoom" feature, the other dimensions and/or characteristics of program guide interface 400 may remain constant. For example, the font used, the width of columns (e.g., the width of listing 402), the "Program Guide" heading, and/or the width of blocks associated with scheduled media programs may remain the same size as before.

Figure 14:
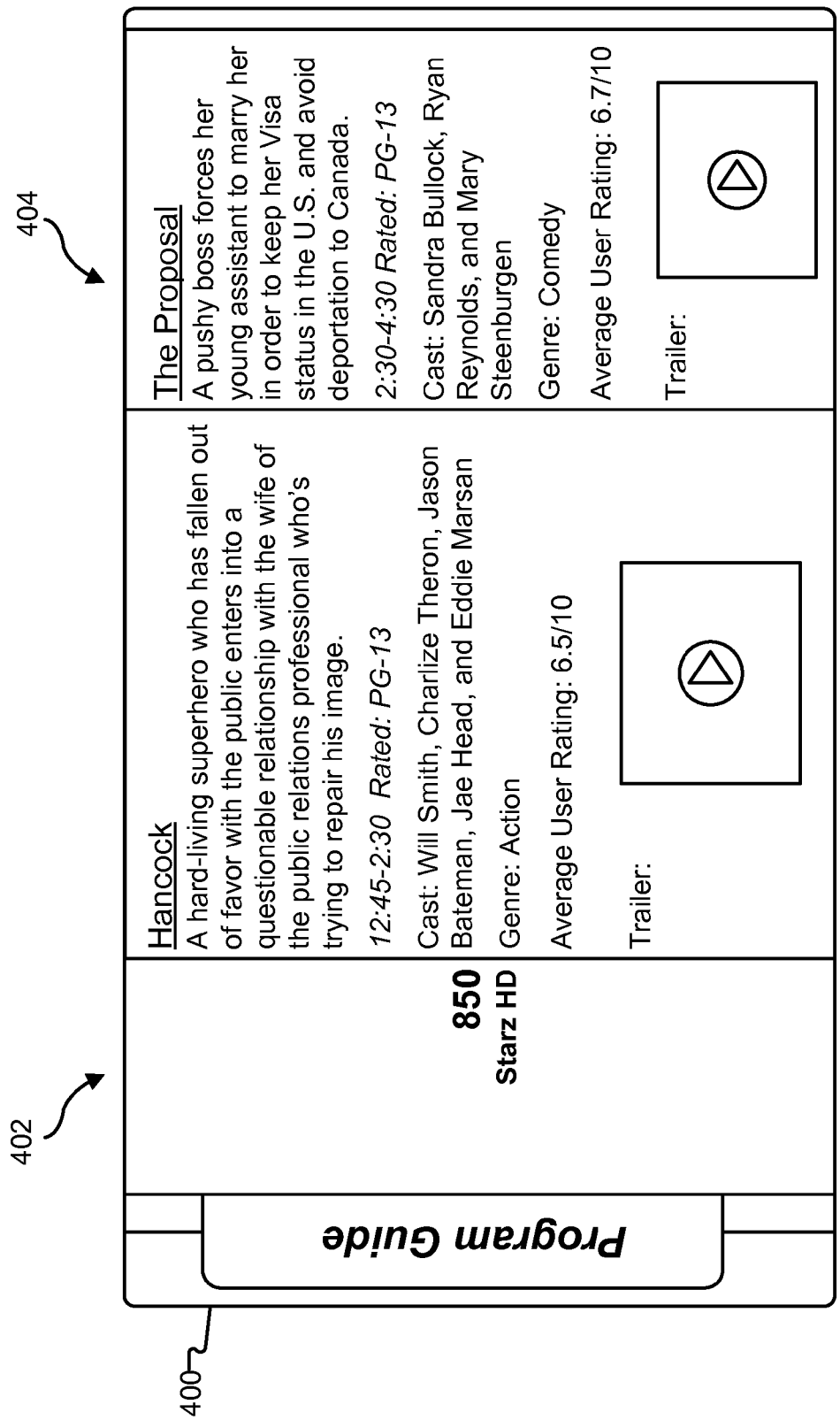

In some examples, a user may continue to provide reverse pinch gestures in relation to program guide interface 400 to continue to expand the level of detail included in program guide information 404. To illustrate, FIGS. 13-14 show additional exemplary views of program guide interface 400 that may be provided in response to additional reverse pinch gestures provided by user 500. For example, in response to a reverse pinch gesture provided in relation to the view of program guide interface 400 shown in FIG. 12, mobile device 200 may present the view of program guide interface 400 shown in FIG. 13, in which program guide information 404 now includes descriptions for each of the scheduled media programs. In response to a reverse pinch gesture provided in relation to the view of program guide interface 400 shown in FIG. 13, mobile device 200 may present the view of program guide interface 400 shown in FIG. 14, in which program guide information 404 now includes names of cast members, genres, user ratings, and embedded media content (e.g., embedded image and/or video content) associated with the scheduled media programs.

To contract the level of detail included in program guide information 404, user 500 may provide one or more pinch gestures. For example, in response to providing a pinch gesture in relation to the view of program guide interface 400 shown in FIG. 14, mobile device 200 may again present the view of program guide interface 400 shown in FIG. 13, and so on until returning to the view of program guide interface 400 shown in FIG. 4. From there, as explained above, user 500 may provide a pinch gesture to access graphical objects (e.g., graphical objects 600, 700, and 802) representative of and configured to act as jump points to corresponding channel groups. Accordingly, from the view of program guide interface 400 shown in FIG. 4, user 500 may selectively access graphical objects using a pinch gesture or expand the level of detail of program guide information 404 using one or more reverse pinch gestures.

The views of program guide interface 400 shown in FIGS. 4-14 are provided for illustrative purposes only. In additional or alternative examples program guide interface 400 may be modified and/or the principles disclosed herein may be implemented in any other suitable manner.

Figure 15:
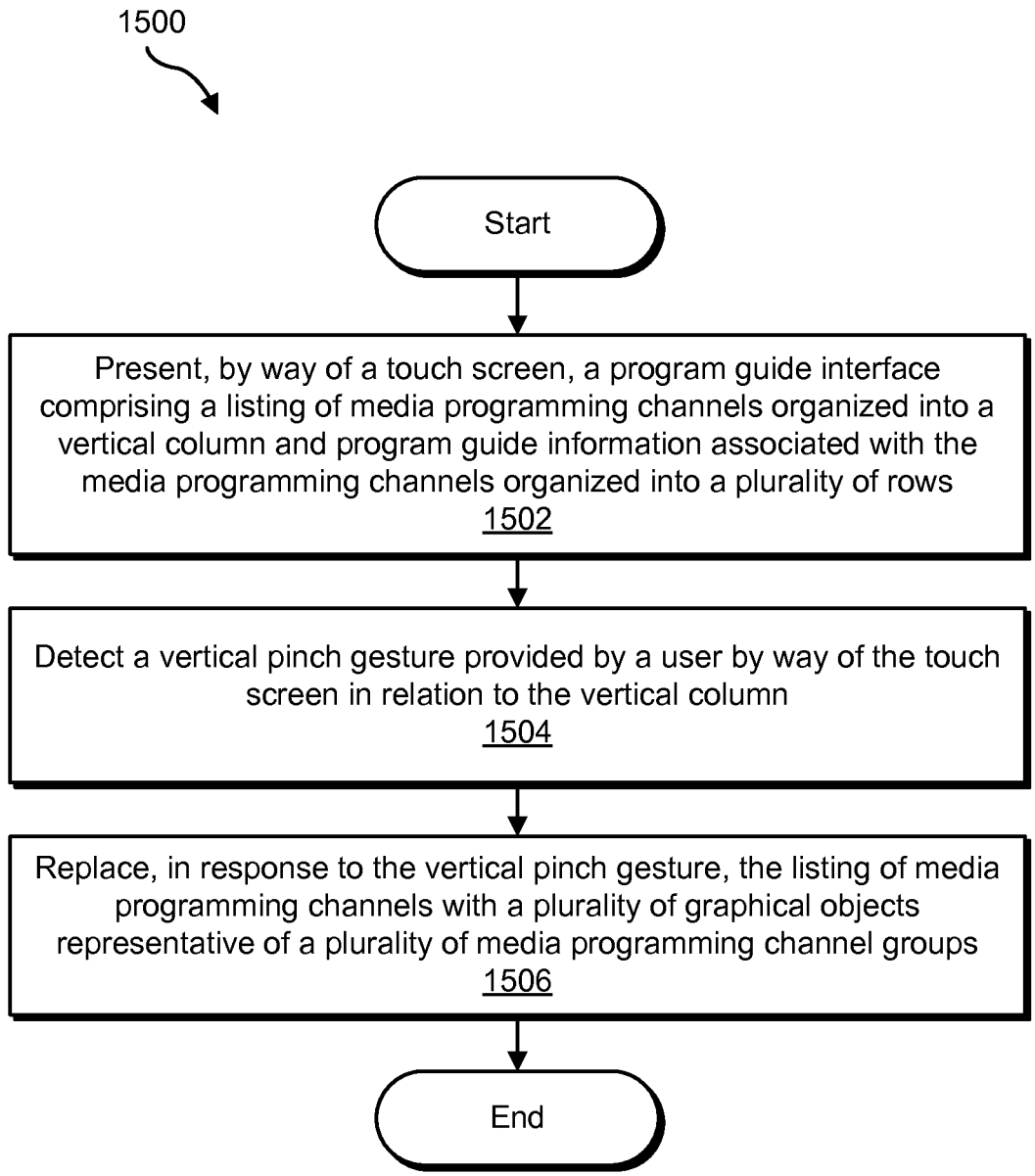
FIG. 15 illustrates another exemplary method of managing a program guide interface according to principles described herein.

FIG. 15 illustrates another exemplary method 1500 of managing a program guide interface. While FIG. 15 illustrates exemplary steps according to one embodiment, other embodiments may omit, add to, reorder, and/or modify any of the steps shown in FIG. 15. One or more steps of method 1500 may be performed by system 100 and/or mobile device 200.

In step 1502, a mobile device presents, by way of a touch screen, a program guide interface comprising a listing of media programming channels organized into a vertical column and program guide information associated with the media programming channels organized into a plurality of rows. In some examples, each row within the plurality of rows may contain program guide information associated with a corresponding media programming channel within the listing of media programming channels. Mobile device 200 may be configured present the program guide interface in any suitable manner, such as disclosed herein.

In step 1504, the mobile device detects a vertical pinch gesture provided by a user by way of the touch screen in relation to the vertical column. Mobile device 200 may be configured to detect the vertical pinch gesture in any suitable manner, such as disclosed herein.

In step 1506, the mobile device replaces, in response to the vertical pinch gesture, the listing of media programming channels with a plurality of graphical objects representative of a plurality of media programming channel groups. For example, mobile device 200 may replace the listing of channels with the plurality of graphical objects in any suitable manner, such as disclosed herein.

Although the foregoing examples are provided with respect to one or more program guide interfaces and corresponding media content programming, the features disclosed herein may be implemented with respect to any other user interfaces and/or content. To illustrate, the features disclosed herein may be implemented with respect to a document interface, an e-reader interface, and/or a web browser interface. For example, a device may display, by way of a touch screen, an electronic document (e.g., a word document, an e-book, a web publication, etc.) for experiencing (e.g., reading) by a user. The user may provide one or more touch gestures (e.g., pinch gestures) to access a menu of jump points associated with the document and configured to allow the user to "jump" to corresponding points (e.g., words, phrases, chapters, etc.) within the document. In some examples, the user may provide a first pinch gesture to zoom out within the view of the document and a second pinch gesture to access the menu of jump points.

The jump points may be associated with any suitable portion or portions of the document. To illustrate, an exemplary jump point may be associated with a particular word or group of words within the document (e.g., a particular noun, a particular quote, etc.), a particular segment of the document (e.g., a particular chapter, a particular section, a particular page or group of pages, etc.), and/or any other suitable portion and/or characteristic of the document.

In some examples, one or more jump points may be configured (e.g., embedded within the document) by a publisher of the document. In further examples, one or more jump points may be automatically generated based on user interactions and/or user profile information. To illustrate, the one or more jump points may be automatically generated to coincide with portions of the document determined to likely be of interest to the user (e.g., based on words, phrases, and/or other content that the user has read, highlighted, commented on, and/or otherwise interacted with in the past). As an example, if the user has exhibited an interest in a particular topic by interacting with content (e.g., words, phrases, quotes, chapters, etc.) associated with the particular topic, one or more jump points to portions of the document associated with that particular topic may be automatically generated and made available to the user.

Accordingly, the features disclosed herein are not limited to program guide interfaces, but may be implemented in accordance with any other suitable user interfaces and/or content.

In certain embodiments, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 16:
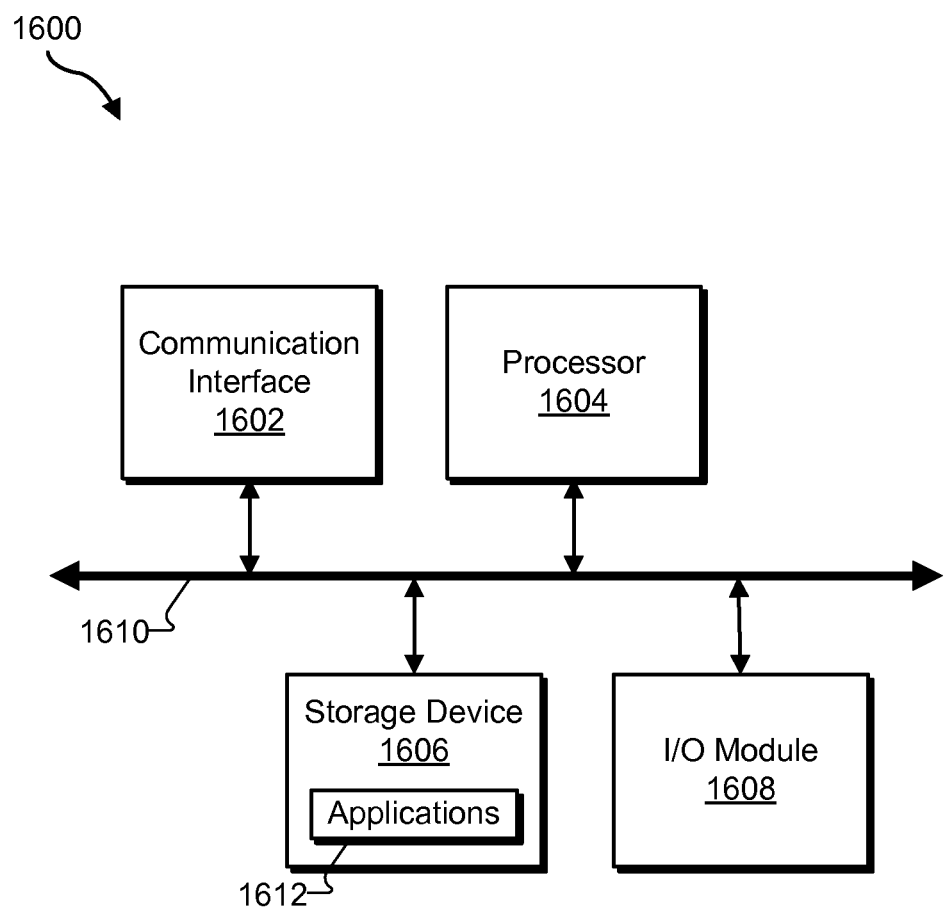
FIG. 16 illustrates an exemplary computing device according to principles described herein.

FIG. 16 illustrates an exemplary computing device 1600 that may be configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, and any other suitable interface. Communication interface 1602 may be configured to interface with any suitable communication media, protocols, and formats, including any of those mentioned above. In at least one embodiment, communication interface 1602 may provide a communicative connection between mobile device 200 and one or more separate media content access devices, a program guide information provider, and a media content provider.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1606. For example, data representative of one or more executable applications 1612 (which may include, but are not limited to, one or more of the software applications described herein) configured to direct processor 1604 to perform any of the operations described herein may be stored within storage device 1606. In some examples, data may be arranged in one or more databases residing within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touch screen component (e.g., a touch screen display), a receiver (e.g., an RF or infrared receiver), and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces (e.g., program guide interfaces) and/or any other graphical content as may serve a particular implementation.

In some examples, any of the features described herein may be implemented and/or performed by one or more components of computing device 1600. For example, one or more applications 1612 residing within storage device 1606 may be configured to direct processor 1604 to perform one or more processes or functions associated with system 100.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   presenting, by a mobile device by way of a touch screen, a program guide interface comprising a listing of media programming channels organized into a vertical column and program guide information associated with each of the media programming channels, wherein the program guide information is organized into a plurality of rows, wherein each row within the plurality of rows is associated with a media programming channel within the listing of media programming channels;
   detecting, by the mobile device, a pinch gesture provided by a user by way of the touch screen within the vertical column;
   grouping, by the mobile device in response to the pinch gesture, the listing of media programming channels into a plurality of media programming channel groups including at least a media programming channel group that includes one or more media programming channels selected for inclusion in the media programming channel group based on a schedule of delivery of a particular media program on the one or more media programming channels within a predetermined time period and at least a social media channel group, the social media channel group including one or more media programming channels selected for inclusion in the social media channel group; and
   presenting, by the mobile device in response to the pinch gesture, a plurality of graphical objects representative of the plurality of media programming channel groups.

2. The method of claim 1, further comprising:
   detecting, by the mobile device, a reverse pinch gesture provided by the user by way of the touch screen in relation to a particular graphical object within the plurality of graphical objects, the particular graphical object representing a particular media programming channel group within the plurality of media programming channel groups; and
   presenting, by the mobile device within the program guide interface and in response to the reverse pinch gesture, a listing of media programming channels from the particular media programming channel group and program guide information associated with the media programming channels from the particular media programming channel group.

3. The method of claim 1, wherein the presenting the plurality of graphical objects comprises presenting the graphical objects within the program guide interface.

4. The method of claim 3, wherein the presenting the graphical objects within the program guide interface comprises replacing the listing of media programming channels with the plurality of graphical objects.

5. The method of claim 1, wherein the presenting the plurality of graphical objects comprises presenting the graphical objects within a window overlaid onto at least a portion of the program guide interface.

6. The method of claim 1, wherein the mobile device comprises at least one of a mobile phone device and a tablet computer.

7. The method of claim 1, wherein at least one additional media programming channel group included in the plurality of media programming channel groups is associated with at least one of a particular series of channel numbers, a particular genre of media content, a particular person, a particular topic, a particular type of media content, and a particular keyword.

8. The method of claim 1, wherein at least one additional media programming channel group included in the plurality of media programming channel groups is customized in accordance with one or more user-configurable parameters provided by the user.

9. The method of claim 1, wherein at least one additional media programming channel group included in the plurality of media programming channel groups is automatically generated in accordance with user profile information associated with the user.

10. The method of claim 1, wherein the media programming channel group within the plurality of media programming channel groups is configured to dynamically change in accordance with the schedule of delivery of the particular media program on the one or more media programming channels.

11. The method of claim 1, further comprising:
  detecting, by the mobile device, a reverse pinch gesture provided by the user by way of the touch screen in relation to the listing of media programming channels; and
  expanding, by the mobile device in response to the reverse pinch gesture, a level of detail associated with the program guide information.

12. The method of claim 11, wherein the expanding the level of detail does not include zooming in on a view of the program guide interface.

13. The method of claim 11, further comprising:
  detecting, by the mobile device, an additional pinch gesture provided in relation to the program guide interface while the program guide interface includes the expanded level of detail associated with the program guide information; and
  contracting, by the mobile device in response to the additional pinch gesture, the level of detail associated with the program guide information.

14. The method of claim 1, wherein the mobile device is configured to operate as a companion device to a media content access device.

15. The method of claim 14, wherein the mobile device is configured to control one or more operations of the media content access device.

16. The method of claim 1, wherein the program guide information associated with each media programming channel comprises information associated with one or more scheduled media programs.

17. The method of claim 1, embodied as computer-executable instructions on at least one non-transitory computer-readable medium.

18. A method comprising:
  presenting, by a mobile device by way of a touch screen, a program guide interface comprising a listing of media programming channels organized into a vertical column and program guide information associated with the media programming channels organized into a plurality of rows, wherein each row within the plurality of rows contains program guide information associated with a media programming channel included in the listing of media programming channels;
  detecting, by the mobile device, a vertical pinch gesture provided by a user by way of the touch screen within the vertical column;
  grouping, by the mobile device in response to the vertical pinch gesture, the listing of media programming channels into a plurality of media programming channel groups including at least a media programming channel group that includes one or more media programming channels selected for inclusion in the media programming channel group based on a schedule of delivery of a particular media program on the one or more media programming channels within a predetermined time period and at least a social media channel group, the social media channel group including one or more media programming channels selected for inclusion in the social media channel group; and
  replacing, by the mobile device in response to the vertical pinch gesture, the listing of media programming channels with a plurality of graphical objects representative of the plurality of media programming channel groups.

19. The method of claim 18, further comprising:
  detecting, by the mobile device, a reverse pinch gesture provided in relation to a particular graphical object within the plurality of graphical objects and representative of a particular media programming channel group within the plurality of media programming channel groups; and
  presenting, by the mobile device within the program guide interface and in response to the reverse pinch gesture, a listing of media programming channels from the particular media programming channel group within the vertical column and program guide information associated with the media programming channels from the particular media programming channel group within the plurality of rows.

20. The method of claim 18, embodied as computer-executable instructions on at least one non-transitory computer-readable medium.

21. A system comprising:
  at least one computing device comprising:
  a user input facility configured to detect a pinch gesture provided by a user by way of a touch screen within a vertical column of a program guide interface displayed on the touch screen, the program guide interface comprising a listing of media programming channels organized into the vertical column and program guide information associated with the media programming channels, wherein the program guide information is organized into a plurality of rows, wherein each row within the plurality of rows is associated with a media programming channel within the listing of media programming channels; and
  a program guide facility communicatively coupled to the user input facility and configured to:
    group, in response to the vertical pinch gesture, the listing of media programming channels into a plurality of media programming channel groups including at least a media programming channel group that includes one or more media programming channels selected for inclusion in the media programming channel group based on a schedule of delivery of a particular media program on the one or more media programming channels within a predetermined time period and at least a social media channel group, the social media channel group including one or more media programming channels selected for inclusion in the social media channel group, and
    present, by way of the touch screen and in response to the pinch gesture, a plurality of graphical objects representative of the plurality of media programming channel groups.

22. The system of claim 21, wherein:
  the user input facility is further configured to detect a reverse pinch gesture provided in relation to a particular graphical object within the plurality of graphical objects and representative of a particular media programming channel group within the plurality of media programming channel groups; and
  the program guide facility is further configured to present, by way of the touch screen and in response to the reverse pinch gesture, a listing of media programming channels from the particular media programming channel group and program guide information associated with the media programming channels from the particular media programming channel group.

23. The method of claim 1, wherein the plurality of media programming channel groups further includes a mood-based channel group, the mood-based channel group including one or more media programming channels selected for inclusion in the mood-based channel group based on an analysis of media content recently accessed by the user.

24. The method of claim 1, wherein the media programming channels are selected for inclusion in the social media channel group based on at least one of social media communications of the user, social media activity, and viewership statistics.

25. The method of claim 1, wherein the plurality of media programming channel groups further includes a user customized channel group, the user customized channel group including one or more media programming channels selected for inclusion in the user customized channel group based on one or more parameters designated by the user.

* * * * *